INVENTOR.
DONALD L. ALEXANDER
BY 3,124,706

SAWTOOTH WAVE FORM GENERATOR EMPLOYING MONOSTABLE CIRCUIT TO CONTROL RESET

Donald L. Alexander, 4882 Cole, San Diego, Calif.
Filed Apr. 28, 1961, Ser. No. 106,287
3 Claims. (Cl. 307—88.5)

This invention relates to a sawtooth waveform circuit and more particularly to a sawtooth waveform circuit with input trigger holdoff means.

According to the invention, an input trigger is applied through an isolation stage and a biased diode to a conventional sawtooth generator. The output of the sawtooth generator, when a predetermined potential is reached, is passed through a second biased diode to a square wave generator which generates a square wave to swamp the input biased diode for a predetermined length of time. This time is then the holdoff time of the circuit. The purpose of the holdoff time is, of course, to obviate any possibility of a spurious trigger retriggering the sawtooth waveform generator before it has completely recovered from a given cycle. When the square wave generator reverts back to its original condition, the input circuit will then be receptive to a new trigger which will start another sawtooth cycle.

It is thus an object of the present invention to provide a sawtooth waveform circuit in which spurious triggers are prevented from entering the circuit during a predetermined time after a given cycle is started.

Another object is the provision of a sawtooth waveform circuit in which the amplitude of a trigger necessary for circuit actuation, can be accurately set.

A further object of the invention is to provide an improved sawtooth waveform circuit which is simple, accurate and requires a minimum of precision components.

Still another object is the provision of an improved sawtooth waveform circuit which requires a minimum of maintenance and calibration.

Other objects and many of the attendant advantages of this invention will be readily appreciated as the same becomes better understood by reference to the following detailed description when considered in connection with the accompanying drawings in which like reference numerals designate like parts throughout the figures thereof and wherein.

Figure 1:
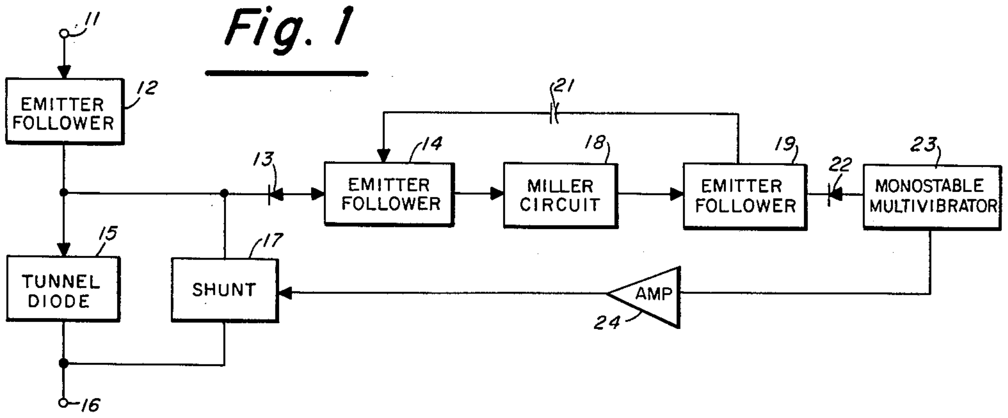
FIG. 1 is a block diagram of a preferred embodiment of the present invention.

Referring now to FIG. 1 there is shown input terminal 11 connected to emitter follower 12. The output of emitter follower 12 is connected through diode 13 to the input of emitter follower 14. The input of diode 13 is connected to one side of tunnel diode 15 the other side of which is connected to terminal 16. Shunt 17 is in parallel with tunnel diode 15. The output of emitter follower 14 is connected to the input of Miller circuit 18, the output of which is connected to the input of emitter follower 19. A feedback is taken from emitter follower 19 through capacitor 21 back to emitter follower 14. The output of emitter follower 19 is connected through diode 22 to monostable multivibrator 23. The output of monostable multivibrator 23 is connected to the input of emitter follower 24, the output of which is connected to the input of shunt 17.

Figure 2:
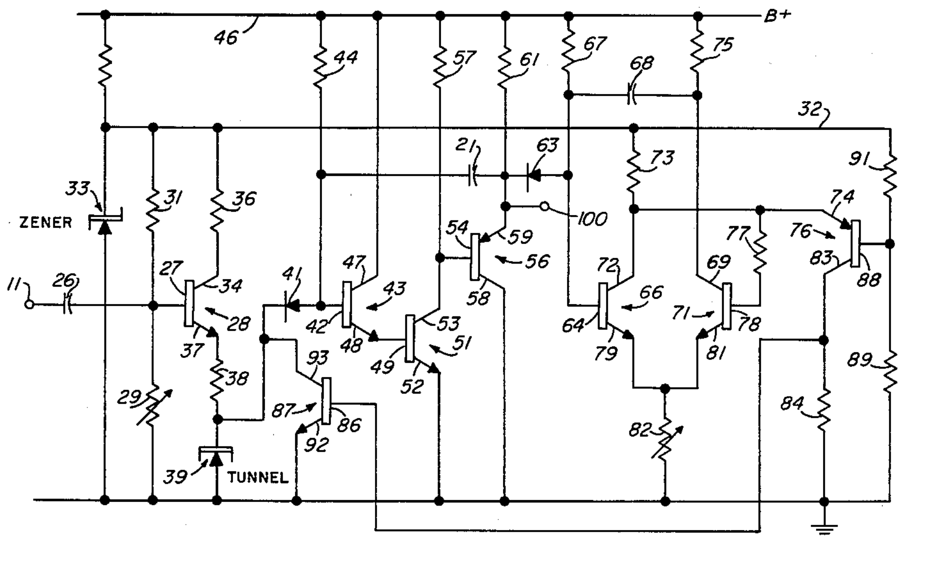
FIG. 2 is a schematic representation of FIG. 1.

Referring to FIG. 2, input terminal 11 is coupled through capacitor 26 to base 27 of transistor 28. Base 27 is also connected through variable resistance 29 to ground and through resistance 31 to bus 32. Zener diode 33 is connected between bus 32 and ground. Collector 34 is connected through resistance 36 to bus 32. Emitter 37 is connected through resistance 38 and tunnel diode 39 to ground. The junction of resistance 38 and tunnel diode 39 is connected through diode 41 to base 42 of transistor 43. Base 42 is also connected through resistance 44 to bus 46, which is the B plus line. Collector 47 of transistor 43 is connected to bus 46. Emitter 48 of transistor 43 is connected to base 49 of transistor 51. Emitter 52 of transistor 51 is connected to ground. Collector 53 of transistor 51 is connected to base 54 of transistor 56 and through resistance 57 to bus 46. Collector 58 of transistor 56 is connected to ground. Emitter 59 of transistor 56 is connected through resistance 61 to bus 46, through capacitance 21 to base 42 of transistor 43, and through diode 63 to base 64 of transistor 66. Base 64 is also connected through resistance 67 to bus 46, and through capacitance 68 to collector 69 of transistor 71. Collector 69 is connected through resistance 75 to bus 46. Collector 72 of transistor 66 is connected through resistance 73 to bus 32, to emitter 74 of transistor 76, and through resistance 77 to base 78 of transistor 71. Emitters 79 and 81 of transistors 66 and 71, respectively, are connected together and through variable resistance 82 to ground. Base 86 of transistor 87 is connected to collector 83 of transistor 76. Base 88 of transistor 76 is connected through resistance 89 to ground and through resistance 91 to bus 32. Emitter 92 of transistor 87 is connected to ground, and collector 93 of transistor 87 is connected to the junction of diode 41 and tunnel diode 39.

Figure 3:
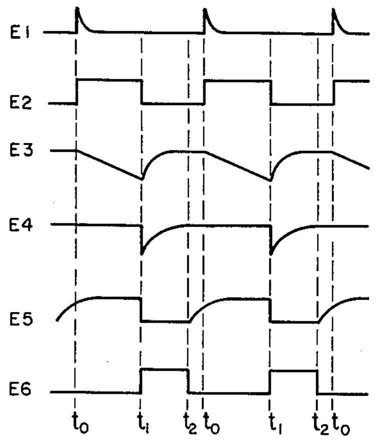
FIG. 3 is a graph showing the various waveforms and their time relation with respect to each other as utilized in the embodiment of FIGS. 1 and 2.

Referring now to FIG. 3 there is shown voltage waveforms E1, E2, E3, E4, E5 and E6 and with reference to time lines $t_0$, $t_1$ and $t_2$. These voltage waveforms are present at the following points of FIG. 2: E1 at input terminal 11; E2 at the junction of diode 41 and tunnel diode 39; E3 at output terminal 100; E4 at base 84 of transistor 66; E5 at collector 69 of transistor 71; E6 at base 86 of transistor 87.

*Operation*

Referring back to FIG. 1, an input trigger at terminal 11 is passed through emitter follower 12 to the cathode of diode 13. When tunnel diode 15 is in one of its stable states, a trigger appearing at the cathode of diode 13 will be passed, and in the other state of tunnel diode 15 it will not be passed. In its quiescent state, tunnel diode is in the state to allow diode 13 to pass a trigger from emitter follower 12. This trigger is then passed through diode 13 to the input of a Miller run-down circuit comprising blocks 14, 18 and 19. Thus a sawtooth waveform which is going in a negative direction, as shown as E3 of FIG. 3, is started at $t_0$. This signal is passed through emitter follower 19 to the cathode of diode 22. When this voltage reaches a predetermined amplitude, diode 22 will conduct, causing monostable multivibrator 23 to flip in one direction. This waveform is indicated at E6 and this occurs at time $t_1$.

Capacitor 21 is shown coupling an output from emitter follower 19 back to an input of emitter follower 14 to create the Miller run-down action as is well known to those skilled in the art. Monostable multivibrator 23 will then stay in its unstable state for a predetermined period of time depending upon the time constants of the circuit, which again, is well known to those skilled in the art. An output of monostable multivibrator 23, which is waveform E6 of FIG. 3, is applied through amplifier 24 to the input of shunt 17. Shunt 17 is preferably a transistor having a base fed input. This waveform, then, at time $t_1$ is positive, causing shunt 17 to conduct heavily which shunts current from tunnel diode 15, preventing an input trigger from shifting tunnel diode 15 into its higher voltage state, tunnel diode 15 having been in its higher voltage state prior to time $t_1$. At this time, tunnel diode 15 will flip, dropping the voltage at the cathode of diode 13 and rendering it conductive. In this condition, diode 13 will not pass a trigger from emitter follower 12, because of the swamping current from shunt 17, which also terminates the Miller action and renders the sweep generator stages ready for a new cycle. Thus the unstable half of monostable multivibrator 23 cycle is the trigger holdoff period of this circuit. At time $t_2$ monostable multivibrator 23 reverts to its stable state cutting off shunt 17 allowing tunnel diode 15 to be receptive to a new trigger and allowing diode 13 to pass an input trigger from emitter follower 12 which will again start the Miller run-down circuit on a new cycle. An output can be taken at any place in the Miller run-down loop.

Referring back to FIG. 2 the quiescent condition of the circuit will now be described. Tunnel diode 39 is in its low voltage condition allowing heavy conduction through transistor 28 and through diode 41. Transistor 43 is held close to cutoff due to the current drawn through resistance 44 causing base 42 to be pulled close to the potential on emitter 48. This also renders transistor 51 in a low current condition. Diode 63 is not conducting because the voltage drop across resistance 61 is less than the voltage drop across resistance 67 rendering the cathode of diode 63 positive with respect to its anode. In this condition, transistor 66 is conducting heavily since base 64 is brought back to bus 46, which is more positive than bus 32, the collector return for transistor 66. The heavy conduction in transistor 66 will then cutoff transistor 71 due to the common cathode resistance 82, and the direct coupling between collector 72 of transistor 66 and base 78 of transistor 71 through resistance 77. Transistor 66 and transistor 71 through their associated circuitry then form a monostable multivibrator, the stable state being as described with transistor 66 conducting heavily and transistor 71 cut off. A potential is then coupled from collector 72 to emitter 74 of transistor 76 which is taken at collector 83 of transistor 76 and coupled to base 86 of transistor 87. This potential in the quiescent state will cut off transistor 87. Transistors 43, 51 and 56 complete the sawtooth generator, in this case a Miller run-down circuit having feedback capacitor 21.

If a positive trigger is applied at terminal 11 shown as waveform E1 in FIG. 3 at time $t_0$, transistor 28 will pull current through tunnel diode 39 causing it to change to its higher voltage condition. This cuts off coupling diode 41, causing base 42 to begin a rise in voltage. As base 42 attempts to rise, emitter 48 follows, causing base 49 to rise, which in turn, causes collector 53 to drop. When collector 53 drops in potential, base 54 also drops, causing emitter 59 to drop. Capacitance 21 then couples this dropping voltage back to base 42 causing the rise on base 42 to be a function of the time constants in the circuit, primarily the size of capacitance 21. The output is taken at terminal 100 which will be a negative going sawtooth waveform shown at E3 in FIG. 3. When the potential at emitter 59 drops below the potential of base 64, diode 63 will conduct, causing base 64 to drop in potential reducing the current through transistor 66 and coupling a positive voltage from collector 72 to base 78 through resistance 77. This will cause the multivibrator comprising transistors 66 and 71 to flip to its unstable state whereby transistor 66 is cut off and transistor 78 is heavily conducting. Thus, a positive going square wave will be coupled between emitter 74 of transistor 76, the output of which is taken at collector 82 and fed directly to base 86 of transistor 87. This will cause transistor 87 to conduct heavily dropping the voltage across tunnel diode 39, causing tunnel diode 39 to revert to its low voltage condition. The current through transistor 87 will then pass through diode 41 swamping any further Miller action and charging capacitance 21 negative on the diode 41 side, and positive on the diode 63 side rendering it ready for the next sweep cycle.

As long as the multivibrator comprising transistor 66 and 71 is in this unstable state, the length of which, of course, is determined primarily by capacitance 68, transistor 87 will conduct heavily, shunting tunnel diode 39 and swamping any trigger applied at terminal 11. Thus, during this period of time shown as the period between $t_1$ and $t_2$ is FIG. 3, particularly in waveform E6, the signal applied to base 86 of transistor 87, the triggers are held off from the sweep circuit and spurious triggering is impossible. The holdoff period can be adjusted by changing capacitance 68. This could be ganged to a switch for changing capacitance 21, which would change the sweep rate. The sweep lengths can be set by adjusting variable resistance 82 which will set the potential on base 64, the anode side of diode 63. This will, of course, determine when diode 63 will conduct and the time multivibrator comprising transistors 66 and 71 will flip to its unstable state. Zener diode 33 is merely placed from bus 32 to ground as a voltage regulator. Resistors 29 and 31 set the bias of input transistor 28 which isolates the trigger from the rest of the circuit and transistors 89 and 91 set the bias on transistor 76.

Thus a simple inexpensive circuit has been disclosed which is extremely reliable and requires a minimum of calibration, adjustment and maintenance. It should be understood, of course, that the foregoing disclosure relates only to a preferred embodiment of the invention and that it is intended to cover all changes and modifications of the example of the invention herein chosen for the purposes of the disclosure, which do not constitute departures from the spirit and scope of the invention.

What is claimed is:

1. A sawtooth waveform circuit comprising sawtooth waveform generating means having a threshold input circuit susceptible to a first predetermined voltage level, whereby upon said input circuit's receiving said first voltage level a sawtooth waveform will start, said waveform generating means having an output coupled through a second voltage level threshold means to a timed voltage level generating means, said timed voltage level generating means operable to produce a second predetermined voltage level for a predetermined time, said timed voltage generating means having an output connected to a holdoff means, said holdoff means having a bistable current-voltage means with current diverting means connected in parallel therewith, said current diverting means connected for control to an output of said timed voltage generating means, said holdoff means having an output connected to said sawtooth generating means input, said holdoff means operable to disable said sawtooth generating means input circuit during said predetermined time.

2. The sawtooth waveform circuit of claim 1 wherein said first and second voltage threshold means are biased diodes.

3. The sawtooth waveform circuit of claim 2 wherein said bistable current-voltage means is a tunnel diode.

References Cited in the file of this patent

UNITED STATES PATENTS 2,949,582 Silliman -------------- Aug. 16, 1960